US011876579B2

United States Patent
Baligh et al.

(10) Patent No.: US 11,876,579 B2
(45) Date of Patent: Jan. 16, 2024

(54) MULTI-SITE MIMO COOPERATION IN CELLULAR NETWORKS

(71) Applicant: MALIKIE INNOVATIONS LIMITED, Dublin (IE)

(72) Inventors: Mohammadhadi Baligh, Kanata (CA); Jianglei Ma, Kanata (CA); Hua Xu, Kanata (CA)

(73) Assignee: Malikie Innovations Limited, Dublin (IE)

(*) Notice: Subject to any disclaimer, the term of this patent is extended or adjusted under 35 U.S.C. 154(b) by 0 days.

(21) Appl. No.: 16/841,326

(22) Filed: Apr. 6, 2020

(65) Prior Publication Data

US 2020/0304174 A1 Sep. 24, 2020

Related U.S. Application Data

(63) Continuation of application No. 12/887,004, filed on Sep. 21, 2010, now Pat. No. 10,615,851, which is a
(Continued)

(51) Int. Cl.
*H04B 7/024* (2017.01)
*H04L 1/06* (2006.01)
(Continued)

(52) U.S. Cl.
CPC ........... *H04B 7/024* (2013.01); *H04L 1/0071* (2013.01); *H04L 1/0625* (2013.01); *H04L 5/001* (2013.01);
(Continued)

(58) Field of Classification Search
CPC .... H04B 7/024; H04B 7/0669; H04B 7/0671; H04B 7/0689; H04B 7/12; H04L 1/0071;
(Continued)

(56) References Cited

U.S. PATENT DOCUMENTS 6,246,673 B1 6/2001 Tiedemann, Jr.
6,980,612 B1* 12/2005 Miyoshi ............... H04B 7/0634
455/101
(Continued)

FOREIGN PATENT DOCUMENTS

CN 101406062 4/2009
CN 101447854 6/2009
(Continued)

OTHER PUBLICATIONS

Ibing, Andreas et al.; "Scaleable Network Multicast for Cooperating Base Stations"; Franuhofer Institute for Telecommunications; Berlin, Germany; Jan. 6, 2008, 5 pages.
(Continued)

*Primary Examiner* — Gregory B Sefcheck
*Assistant Examiner* — Joshua Y Smith
(74) *Attorney, Agent, or Firm* — Botos Churchill IP Law LLP

(57) ABSTRACT

A method of serving a given data stream to a target mobile terminal, in a cellular communications network that includes a plurality of transmitting sites wherein each transmitting site including at least one antenna, is provided. The method includes designating at least two of the plurality of transmitting sites as cooperating sites; assigning tones to each transmitting site from a sub-band associated with the cooperating sites; dividing the data stream into at least two sub-data streams, each of the sub-data streams for transmission over selected tones; and interlacing tones of the cooperating sites in accordance with a selected one of a time switching and a frequency switching transmit diversity technique. Other techniques for multi-site MIMO cooperation are also provided.

19 Claims, 10 Drawing Sheets

Related U.S. Application Data continuation-in-part of application No. 13/068,837, filed on Sep. 21, 2009, now Pat. No. 8,693,442.

(60) Provisional application No. 61/098,978, filed on Sep. 22, 2008.

(51) Int. Cl.
  H04L 5/00 (2006.01)
  H04W 72/542 (2023.01)
  H04L 1/00 (2006.01)
  H04B 7/06 (2006.01)
  H04B 7/12 (2006.01)

(52) U.S. Cl.
  CPC ............ H04L 5/003 (2013.01); H04L 5/0007 (2013.01); H04L 5/0035 (2013.01); H04B 7/0669 (2013.01); H04B 7/0671 (2013.01); H04B 7/0689 (2013.01); H04B 7/12 (2013.01); H04L 1/0026 (2013.01); H04L 1/0656 (2013.01); H04L 1/0668 (2013.01); H04W 72/542 (2023.01)

(58) Field of Classification Search
  CPC ..... H04L 1/0625; H04L 5/0007; H04L 5/001; H04L 5/003; H04L 5/0035; H04L 1/0026; H04L 1/0656; H04L 1/0668; H04W 72/1231
  See application file for complete search history.

(56) References Cited

U.S. PATENT DOCUMENTS

| | | | |
|---|---|---|---|
| 7,403,570 B2 | 7/2008 | Ma et al. | |
| 7,593,732 B2 | 9/2009 | Kim et al. | |
| 7,724,838 B2 | 5/2010 | Mantravadi | |
| 8,014,734 B2 * | 9/2011 | Kludt | H04B 7/0682 455/69 |
| 8,179,775 B2 | 5/2012 | Chen et al. | |
| 8,488,480 B2 | 7/2013 | Han et al. | |
| 8,693,442 B2 * | 4/2014 | Baligh | H04B 7/024 370/315 |
| 8,717,947 B2 | 5/2014 | Liao et al. | |
| 8,767,682 B2 | 7/2014 | Baligh et al. | |
| 2003/0069043 A1 | 4/2003 | Chhaochharia et al. | |
| 2003/0092456 A1 | 5/2003 | Dent | |
| 2004/0095907 A1 | 7/2004 | Agee et al. | |
| 2004/0152491 A1 | 8/2004 | Lobinger et al. | |
| 2004/0202119 A1 | 10/2004 | Edge | |
| 2004/0229624 A1 | 11/2004 | Cai et al. | |
| 2004/0259565 A1 | 12/2004 | Lucidarme | |
| 2005/0152476 A1 | 7/2005 | Coersmeier | |
| 2005/0265280 A1 * | 12/2005 | Roh | H04L 27/2608 370/328 |
| 2006/0245347 A1 | 11/2006 | Jayaraman et al. | |
| 2006/0280273 A1 | 12/2006 | Mueller-Weinfurtner | |
| 2007/0021151 A1 * | 1/2007 | Mori | H04W 16/28 455/562.1 |
| 2007/0099578 A1 | 5/2007 | Adeney et al. | |
| 2007/0104283 A1 | 5/2007 | Han et al. | |
| 2007/0190997 A1 | 8/2007 | Moon et al. | |
| 2007/0195908 A1 * | 8/2007 | Attar | H04L 5/0026 375/267 |
| 2007/0281643 A1 | 12/2007 | Kawai | |
| 2008/0152059 A1 * | 6/2008 | Suemitsu | H04B 7/269 375/356 |
| 2008/0165866 A1 | 7/2008 | Teo et al. | |
| 2008/0247364 A1 | 10/2008 | Kim et al. | |
| 2008/0272953 A1 | 11/2008 | Zheng et al. | |
| 2008/0273612 A1 | 11/2008 | Khojastepour et al. | |
| 2008/0274692 A1 | 11/2008 | Larsson | |
| 2008/0318613 A1 | 12/2008 | Balachandran et al. | |
| 2009/0010215 A1 | 1/2009 | Kim et al. | |
| 2009/0017753 A1 | 1/2009 | Kim et al. | |
| 2009/0034448 A1 | 2/2009 | Miller et al. | |
| 2009/0097468 A1 | 4/2009 | Yi et al. | |
| 2009/0103648 A1 * | 4/2009 | Fukuoka | H04L 5/0044 375/267 |
| 2009/0110114 A1 | 4/2009 | Onggosanusi et al. | |
| 2009/0111473 A1 | 4/2009 | Tao et al. | |
| 2009/0117911 A1 | 5/2009 | Molisch et al. | |
| 2009/0137237 A1 | 5/2009 | Nakashima et al. | |
| 2009/0147728 A1 | 6/2009 | Atia et al. | |
| 2009/0190842 A1 | 7/2009 | Monro | |
| 2009/0232113 A1 | 9/2009 | Tamaki | |
| 2009/0262846 A1 | 10/2009 | Ko et al. | |
| 2009/0264143 A1 | 10/2009 | Satou | |
| 2009/0268657 A1 | 10/2009 | Alexiou et al. | |
| 2009/0285173 A1 | 11/2009 | Koorapaty et al. | |
| 2009/0296626 A1 | 12/2009 | Hottinen et al. | |
| 2009/0299836 A1 | 12/2009 | Sachs et al. | |
| 2010/0009717 A1 * | 1/2010 | Monogioudis | H04W 72/046 455/562.1 |
| 2010/0027454 A1 | 2/2010 | Hou et al. | |
| 2010/0034312 A1 | 2/2010 | Muharemovic et al. | |
| 2010/0035555 A1 | 2/2010 | Bala et al. | |
| 2010/0067363 A1 | 3/2010 | Yu | |
| 2010/0067368 A1 | 3/2010 | Lee et al. | |
| 2010/0069122 A1 | 3/2010 | Ito | |
| 2010/0150266 A1 | 6/2010 | Mondal et al. | |
| 2010/0189055 A1 | 7/2010 | Ylitalo | |
| 2010/0234053 A1 | 9/2010 | Zangi et al. | |
| 2010/0265968 A1 | 10/2010 | Baldemair et al. | |
| 2010/0323611 A1 * | 12/2010 | Choudhury | H04B 7/024 455/7 |
| 2011/0007707 A1 | 1/2011 | Kazmi | |
| 2011/0034175 A1 | 2/2011 | Fong et al. | |
| 2011/0041021 A1 | 2/2011 | Khoshnevis et al. | |
| 2011/0063989 A1 | 3/2011 | Yang et al. | |
| 2011/0064159 A1 | 3/2011 | Kim et al. | |
| 2011/0105170 A1 | 5/2011 | Gan et al. | |
| 2011/0194540 A1 | 8/2011 | Baligh et al. | |
| 2012/0008577 A1 | 1/2012 | Han et al. | |
| 2012/0020319 A1 | 1/2012 | Song et al. | |
| 2013/0029677 A1 | 1/2013 | Baligh et al. | |

FOREIGN PATENT DOCUMENTS

| | | |
|---|---|---|
| CN | 101453438 | 6/2009 |
| KR | 2008-0054425 | 6/2008 |
| KR | 2009-0074136 | 7/2009 |

OTHER PUBLICATIONS

Alamouti, Siavash; "A Simple Transmit Diversity Technique for Wireless Communications"; IEEE Journal on Selected Areas in Communications; vol. 16, No. 8; Oct. 1, 1998, 9 pages.

Nortel; "Discussion and Link Level Simulation Results on LTE—A Downlink Multi-Site MIMO Cooperation"; 3GPP TSG-RAN Working Group 1 Meeting #55 (R1-084465); Prague, Czech Republic; Nov. 10-14, 2008, 9 pages.

CATT; "Aspects of Joint Processing in Downlink CoMP"; 3GPP TSG RAN WG1 Meeting #55bis (R1-090193); Ljubljana, Slovenia; Jan. 12-16, 2009, 11 pages.

Office Action issued in U.S. Appl. No. 12/887,004 dated Sep. 28, 2017, 40 pages.

Advisory Action issued in U.S. Appl. No. 12/887,004 dated Dec. 14, 2017, 3 pages.

United States Office Action in U.S. Appl. No. 12/887,004, dated Feb. 22, 2018, 36 pages.

Final Office Action issued in U.S. Appl. No. 12/887,004 dated Jul. 25, 2018, 38 pages.

Advisory Action issued in U.S. Appl. No. 12/887,004 dated Nov. 16, 2018, 3 pages.

Non-Final Office Action issued in U.S. Appl. No. 12/887,004 dated Jan. 8, 2019, 33 pages.

Final Office Action issued in U.S. Appl. No. 12/887,004 dated Jun. 3, 2019, 34 pages.

(56) References Cited

OTHER PUBLICATIONS

International Search Report and Written Opinion of the International Searching Authority issued in International Application No. PCT/CA2010/001510 dated Jun. 9, 2011, 6 pages.
Office Action issued in Chinese Application No. 201080052611.0 dated Jul. 3, 2014, 6 pages.
Office Action issued in Chinese Application No. 201080052611.0 dated Jan. 12, 2015, 6 pages.
Office Action issued in Korean Application No. 10-2012-7010249 dated Jun. 1, 2016, 5 pages.
Office Action issued in Korean Application No. 10-2012-7010249 dated Dec. 20, 2016, 5 pages.
Office Action issued in Korean Application No. 10-2012-7010249 dated May 19, 2017, 3 pages.
Office Action issued in Korean Application No. 10-2012-7010249 dated Jul. 11, 2017, 9 pages.
Office Action issued in Canadian Application No. 2774725 dated Aug. 11, 2016, 3 pages.
Office Action issued in Canadian Application No. 2774725 dated Jun. 13, 2017, 4 pages.
Notice of Allowance issued in Canadian Application No. 2774725 dated May 4, 2018, 1 page.
Partial Search Report issued in European Aplication No. 10822938.6 dated Jan. 3, 2017, 11 pages.
Extended European Search Report issued in European Application No. 10822938.6 dated Mar. 17, 2017, 19 pages.
European Communication Pursuant to Article 94(3) in Application No. 10822938.6 dated Apr. 11, 2018, 7 pages.
Office Action issued in European Application No. 10822938.6 dated Jun. 24, 2019, 4 pages.
Office Action issued in Indian Application No. 2557/CHENP/2012 dated Mar. 22, 2019, 7 pages.
Subsequent Examination Report issued in Indian Application No. 2557/CHENP/2012 dated Aug. 20, 2019, 2 pages.
Extended European Search Report issued in corresponding European Patent Application No. 23158347.7, dated Jun. 1, 2023, 12 pages.

* cited by examiner

MULTI-SITE MIMO COOPERATION IN CELLULAR NETWORKS

CROSS-REFERENCE TO RELATED APPLICATIONS

This application is a continuation of U.S. patent application Ser. No. 12/887,004, filed on Sep. 21, 2010, and issued as U.S. Pat. No. 10,615,851 on Apr. 7, 2020, and claims the benefit of U.S. Provisional Patent Application No. 61/244,115, filed on Sep. 21, 2009, which is a continuation-in-part of U.S. patent application Ser. No. 13/068,837, resulting from conversion under 37 C.F.R. § 1.53(c)(3) of U.S. Provisional Patent Application No. 61/244,115, filed on Sep. 21, 2009, and issued as U.S. Pat. No. 8,693,442 on Apr. 8, 2014 which claims the benefit of U.S. Provisional Patent Application No. 61/098,978, filed on Sep. 22, 2008, the contents of which are incorporated by reference herein.

FIELD OF THE INVENTION

This application relates to cellular communications systems. More specifically, this application relates to MIMO transmission techniques between cellular sites.

BACKGROUND OF THE INVENTION

Cellular networks are divided into many small geographic areas, called cells or sites. Each cell is adjacent to one or more cells. Collectively, the cells provide cellular service to a large geographic area. Each cell is typically served by one or more corresponding base stations. Within each cell, the one or more corresponding base stations serve one or more mobile terminals (or mobile stations) situated within the cell. As further detailed below, other equipment, such as a relay, which aids in base station-mobile terminal communications may also serve a cell.

Signals propagating through a given cell may include transmissions from equipment within the cell (e.g. mobile terminals and base stations within the cell), and may also include signals transmitted from adjacent cells. Thus, in certain instances, a mobile terminal may receive relatively strong signals from multiple transmitters. For example, while situated near the border of one cell and an adjacent cell, a mobile terminal may receive signals transmitted from both the base station serving the cell within which the mobile terminal is situated, and from the base station serving the adjacent cell. Moreover, a mobile terminal may receive signals from multiple sources within a given cell, such as relays and other base stations. Signals from these various sources may interfere, for example, by constructive superposition of signals from the various sites, with the signal expected or desired to be received by the mobile terminal.

Consequently, it would be advantageous if the various signals received by a mobile terminal could be combined in such a way as to transform what would otherwise be interference into a useful signal from the perspective of the mobile terminal. Various techniques of doing so have been proposed and generally include: cooperation between base stations and relays, between relays and base stations with distributed antennas, within the same cell; and between base stations of two or more different cells.

Open loop cooperation between the cooperating equipment typically involves transmit diversity schemes/techniques and spatial multiplexing schemes. Transmit diversity schemes included band switching transmit diversity wherein different sub-bands were allocated to a particular mobile terminal in the cooperating sites; phase delay diversity (PDD)/short cyclic delay diversity (CDD) wherein phase delay or cyclic delay was applied to the signal to generate spatial diversity through forward error correction; and space-time-frequency transmit diversity wherein different cooperating sites used the same resource using space-tone codes. In the spatial multiplexing scheme, different cooperating sites transmitted independent data streams to the receiver. A drawback of this known open loop cooperation technique was that it did not exploit channel state information (CSI) feedback to the cooperating site. Consequently, this technique was more useful for medium and high speed users and less useful for low speed users where channel state information could be exploited to provide better quality of service.

Another technique, interference alignment, employs multi-site multi-user MIMO (MU-MIMO) techniques wherein different MIMO cooperating sites transmitted sets of independent data to different users using the same shared resource. The cooperating sites aligned their induced interferences at all nodes. Drawbacks of this technique included that it could only be applied to high geometry users, required pairing up of two or more users serviced by the same base station and required knowledge by the transmitting site (e.g. base station) channel conditions. Since channel condition data or information from which channel conditions could be calculated by the transmitting site had to be transmitted from the mobile terminals, this technique resulted in higher feedback overhead. Consequently, this technique was largely applied to fixed or low speed users.

A need therefore exists for improved techniques for multi-transmitting site cooperation.

SUMMARY OF THE INVENTION

In a first aspect of the invention, there is provided, in a cellular communications network that includes a plurality of transmitting sites, each transmitting site including at least one antenna, a method of serving a given data stream to a target mobile terminal, including: designating at least two of the plurality of transmitting sites as cooperating sites; assigning tones to each transmitting site from a sub-band associated with the cooperating sites; dividing the data stream into at least two sub-data streams, each of the sub-data streams for transmission over selected tones; and interlacing tones of the cooperating sites in accordance with a selected one of a time switching and a frequency switching transmit diversity technique.

In a second aspect of the invention, there is provided, in a cellular communications network including a plurality of transmitting sites, a method of serving a data stream to a target mobile terminal, including: designating a first transmitting site and a second transmitting site as cooperating sites; at the first transmitting site, transmitting the data stream to the mobile terminal in accordance with a beamforming technique; and at the second transmitting site, transmitting the data stream to the mobile terminal in accordance with a beamforming technique wherein the beam transmitted by the second transmitting site is adjusted to result in constructive addition of beams arriving at the target mobile terminal from the first and the second transmitting sites.

In a third aspect of the invention, there is provided, in a cellular communications network including a plurality of transmitting sites, a method of serving a target mobile terminal, including: designating at least two of the plurality of transmitting sites a cooperating site; designating one transmitting site of the cooperating site as a serving site; designating a non-serving transmitting site as a phase reference site; and assigning a fixed precoder to the phase reference site. Only at the serving site, receiving an indicator of a precoder for phase correction; and encoding transmissions to the target mobile device using the indicated precoder.

In a fourth aspect of the invention, there is provided, in a cellular communications network comprising a plurality of transmitting sites, a method of serving a target mobile terminal, including: designating two unique subsets of transmitting sites as a first and second cooperating site; employing closed loop techniques within each cooperating site; and employing open loop cooperation techniques between cooperating sites.

Other aspects and features of the present invention will become apparent to those of ordinary skill in the art upon review of the following description of specific embodiments of the disclosure in conjunction with the accompanying figures.

BRIEF DESCRIPTION OF THE DRAWINGS

In the figures which illustrate by way of example only, embodiments of the present disclosure.

Like reference numerals are used in different figures to denote similar elements.

DETAILED DESCRIPTION

Figure 1:
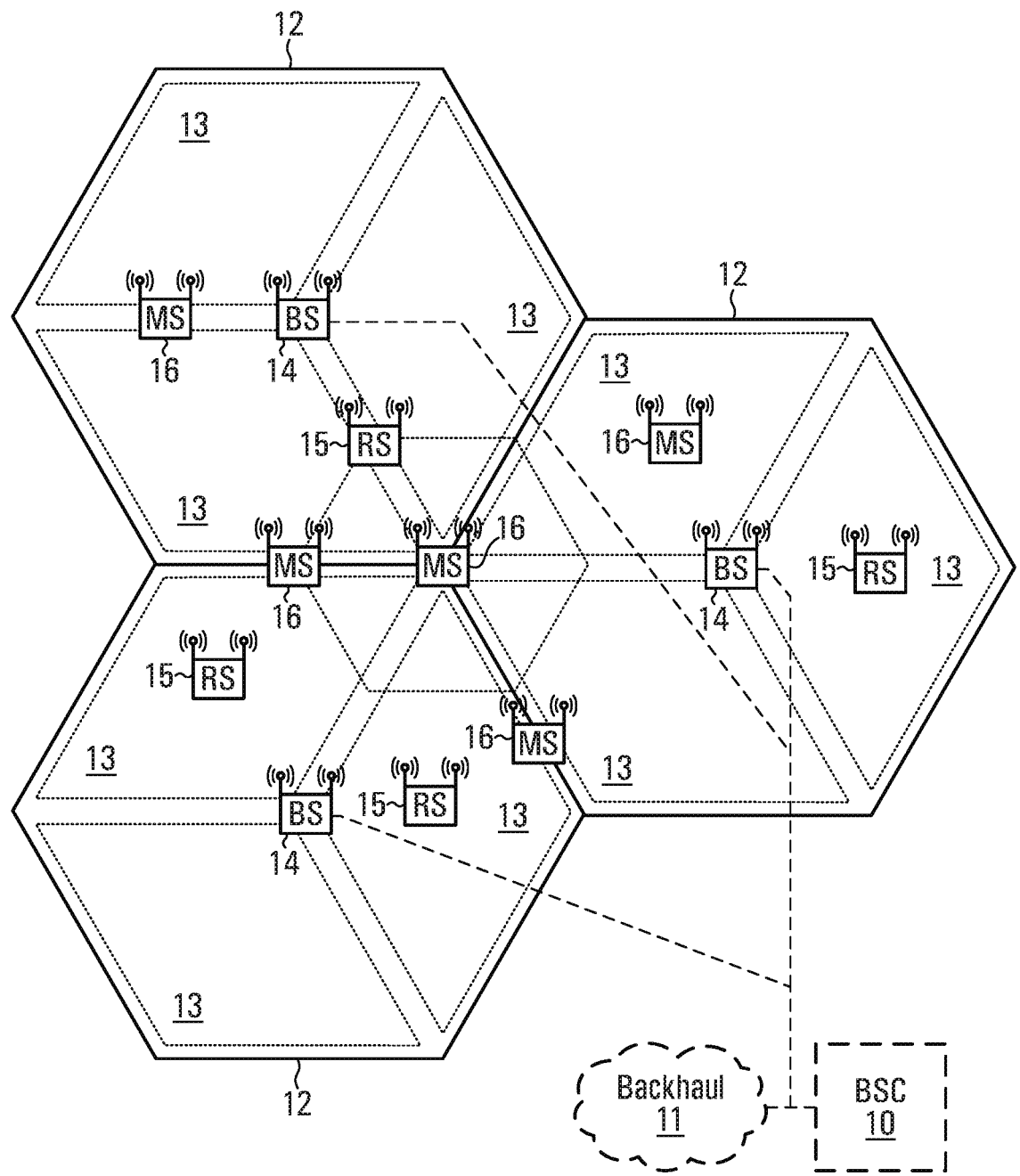
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14.

In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed can be handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the interne, both not shown) over a backhaul network 11. In some configurations, a base station controller 10 is not needed.

Figure 2:
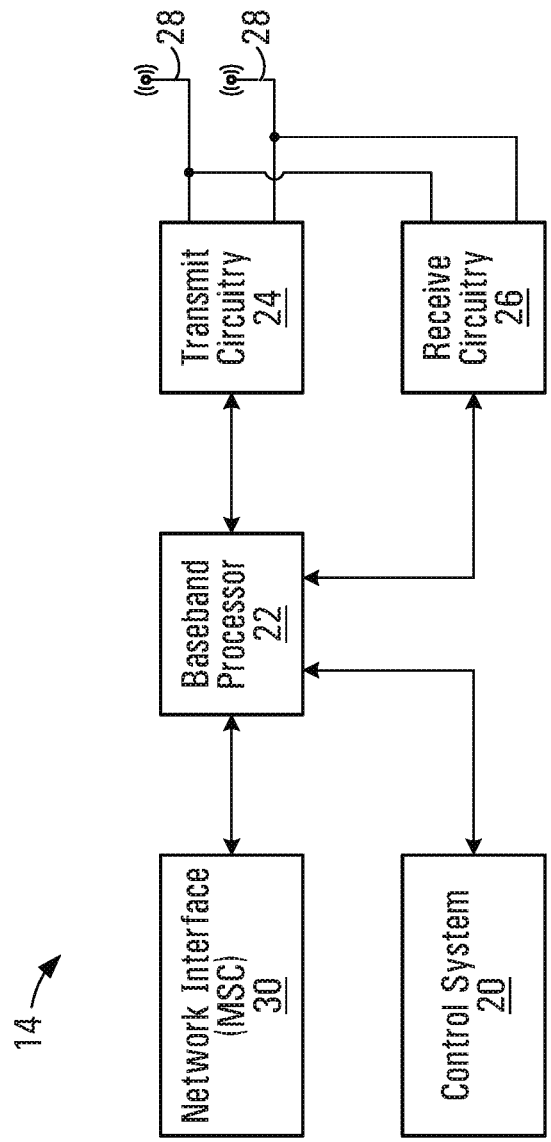
FIG. 2 is a block diagram of an example base station that might be used to implement some embodiments of the present application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
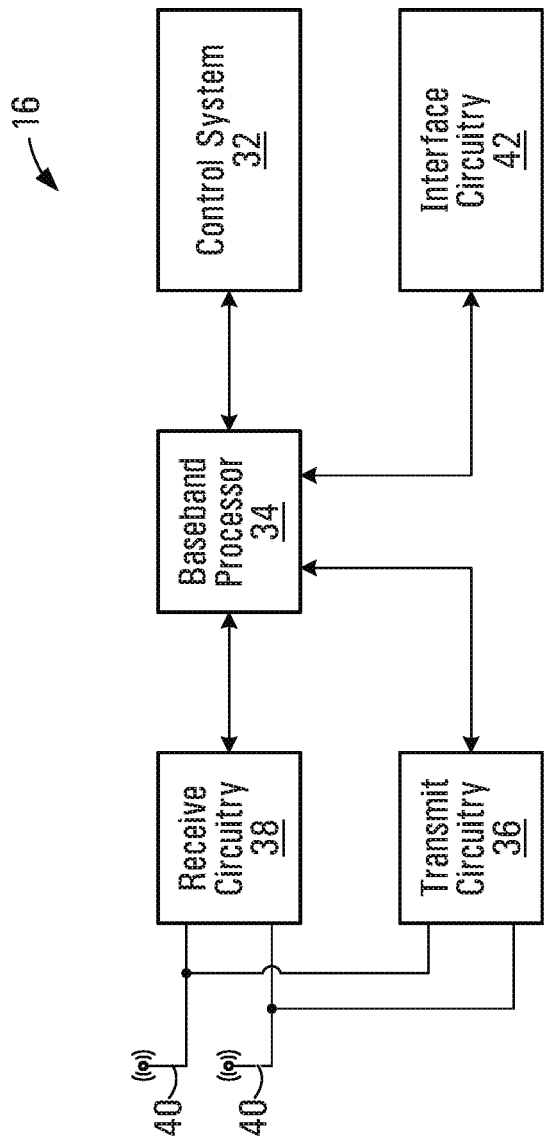
FIG. 3 is a block diagram of an example wireless terminal that might be used to implement some embodiments of the present application.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
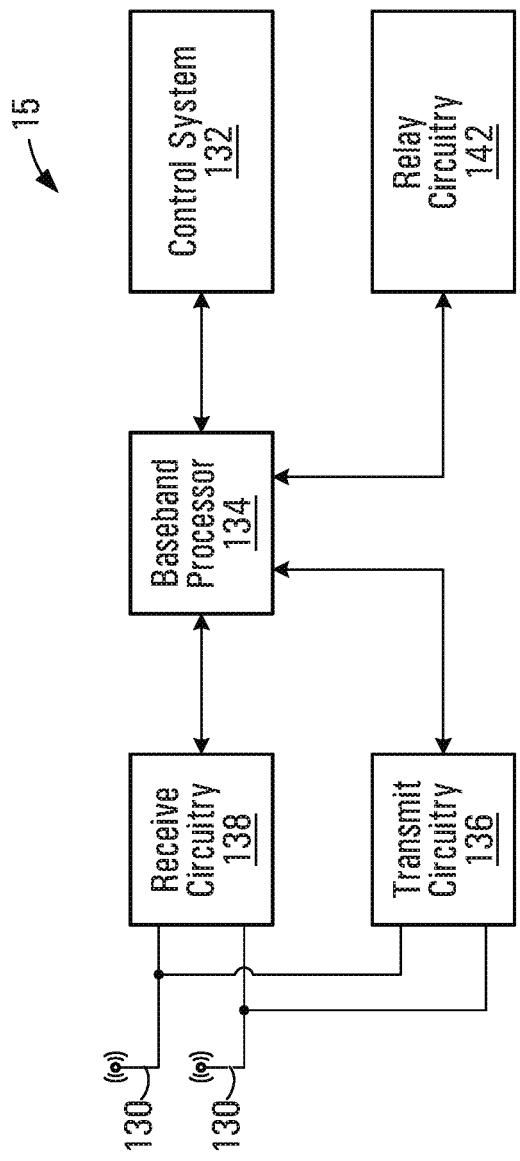
FIG. 4 is a block diagram of an example relay station that might be used to implement some embodiments of the present application.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
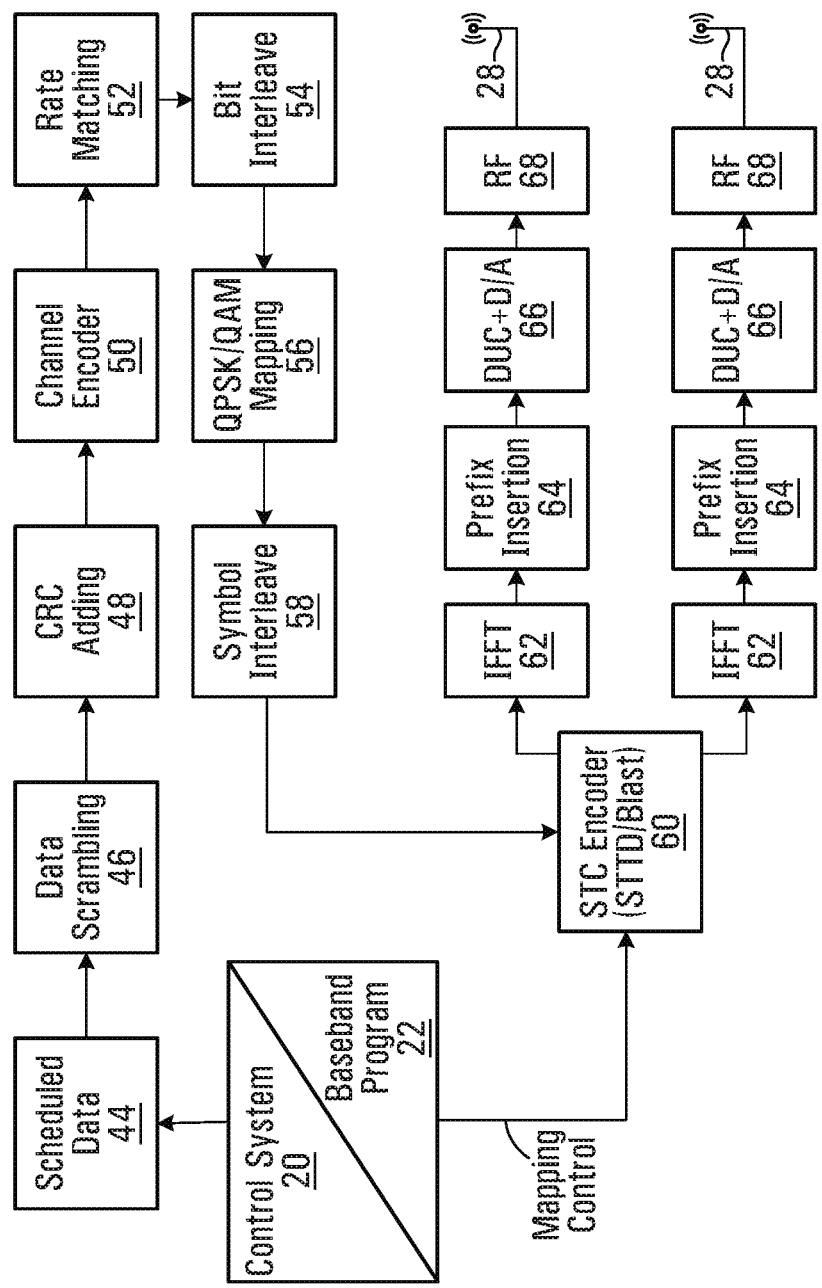
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
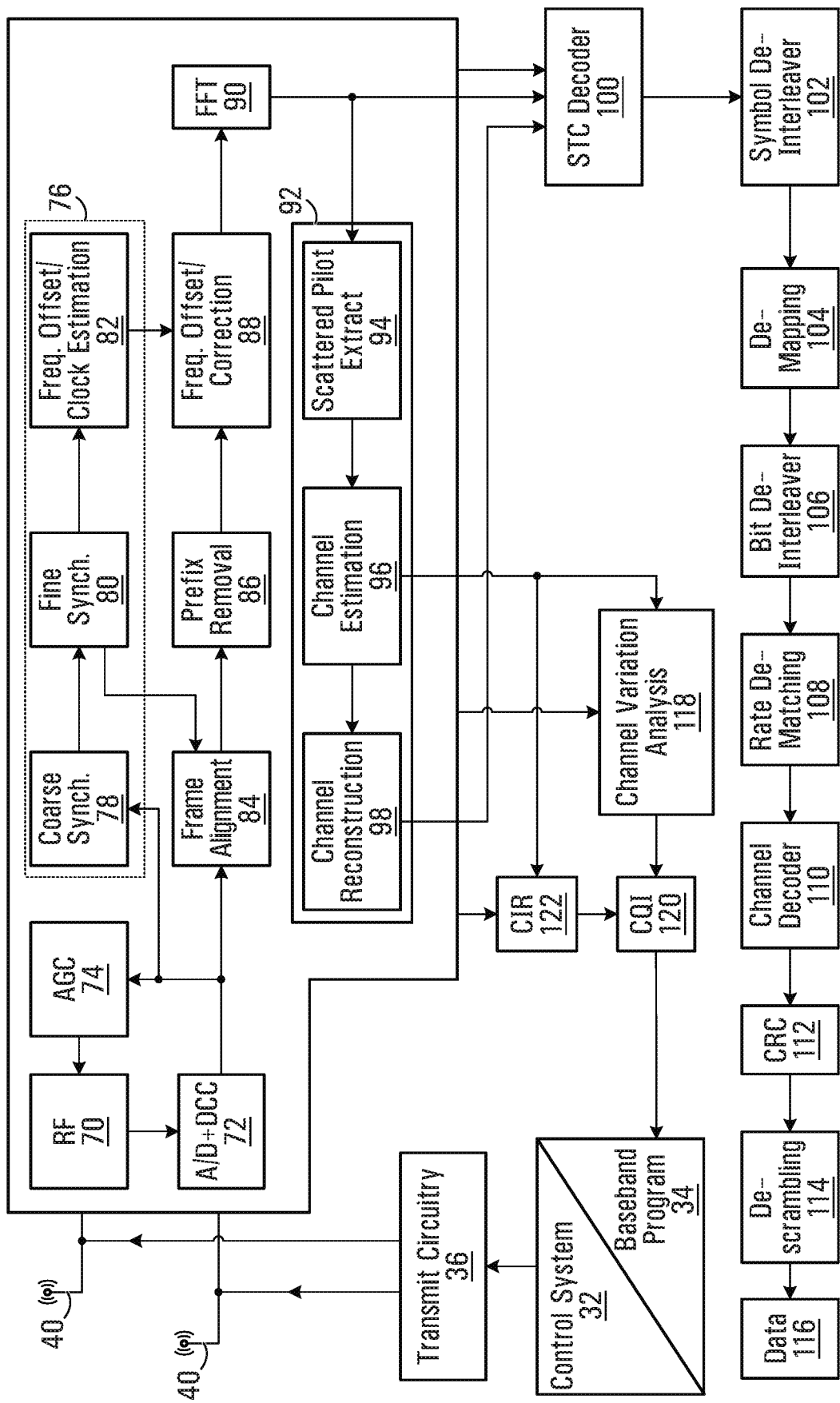
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each received path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-tointerference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7A:
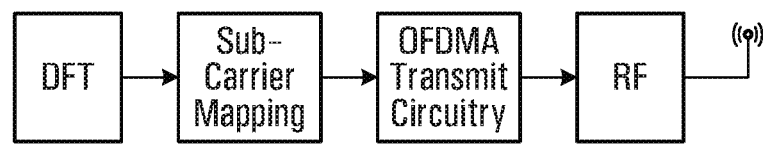
FIG. 7A and FIG. 7B is an example SC-FDMA transmitter and receiver for single-in single-out (SISO) configuration provided in accordance with one embodiment of the present application.
Figure 7B:
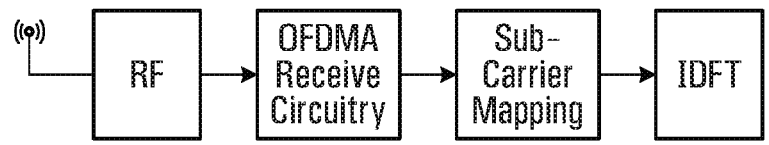

Referring to FIG. 7A and FIG. 7B, an example SC-FDMA transmitter 7(a) and receiver 7(b) for single-in single-out (SISO) configuration is illustrated provided in accordance with one embodiment of the present application. In SISO, mobile stations transmit on one antenna and base stations and/or relay stations receive on one antenna. FIG. 7A and FIG. 7B illustrates the basic signal processing steps needed at the transmitter and receiver for the LTE SC-FDMA uplink. In some embodiments, SC-FDMA (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFT pre-coded OFDMA scheme, or, it can be viewed as a single carrier (SC) multiple access scheme. There are several similarities in the overall transceiver processing of SC-FDMA and OFDMA. Those common aspects between OFDMA and SC-FDMA are illustrated in the OFDMA TRANSMIT CIRCUITRY and OFDMA RECEIVE CIRCUITRY, as they would be obvious to a person having ordinary skill in the art in view of the present specification. SC-FDMA is distinctly different from OFDMA because of the DFT pre-coding of the modulated symbols, and the corresponding IDFT of the demodulated symbols. Because of this pre-coding, the SC-FDMA sub-carriers are not independently modulated as in the case of the OFDMA sub-carriers. As a result, PAPR of SC-FDMA signal is lower than the PAPR of OFDMA signal. Lower PAPR greatly benefits the mobile terminal in terms of transmit power efficiency.

FIGS. 1 to 7A and 7B provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Figure 8A:
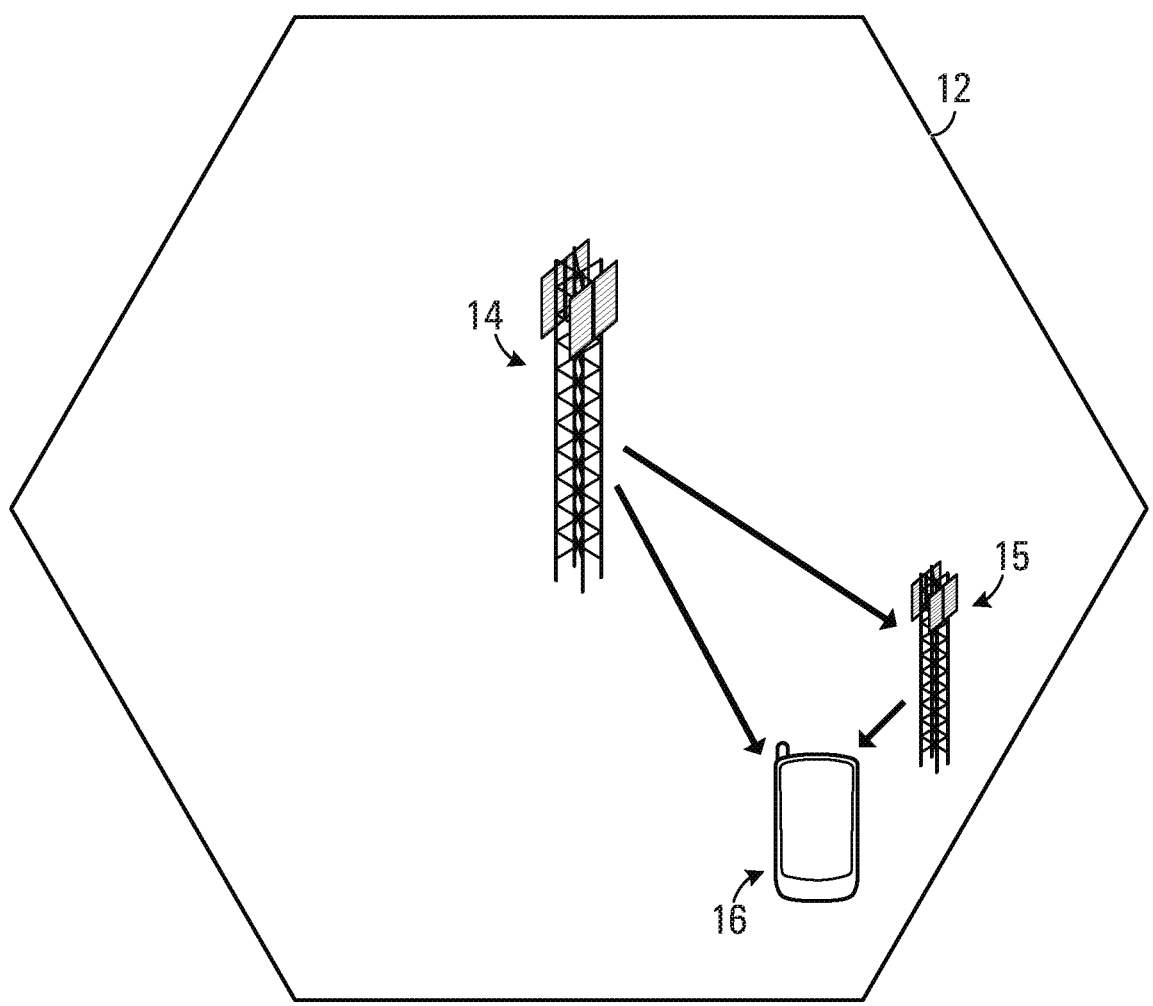
FIGS. 8A, 8B and 8C are block diagrams of an exemplary cellular communications system including cooperating transmitting sites in which the disclosed embodiments of the present application may be applied.
Figure 8B:
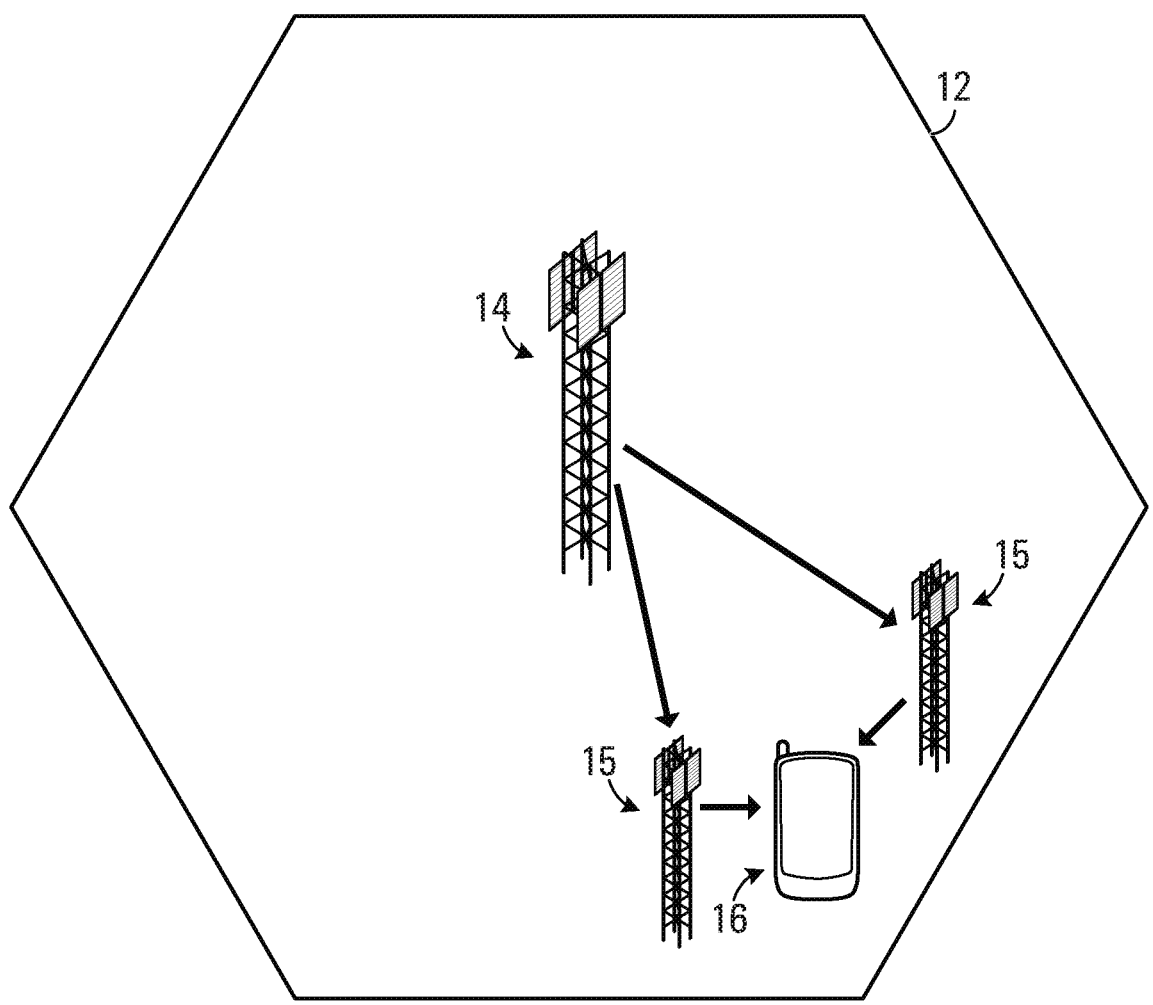
Figure 8C:
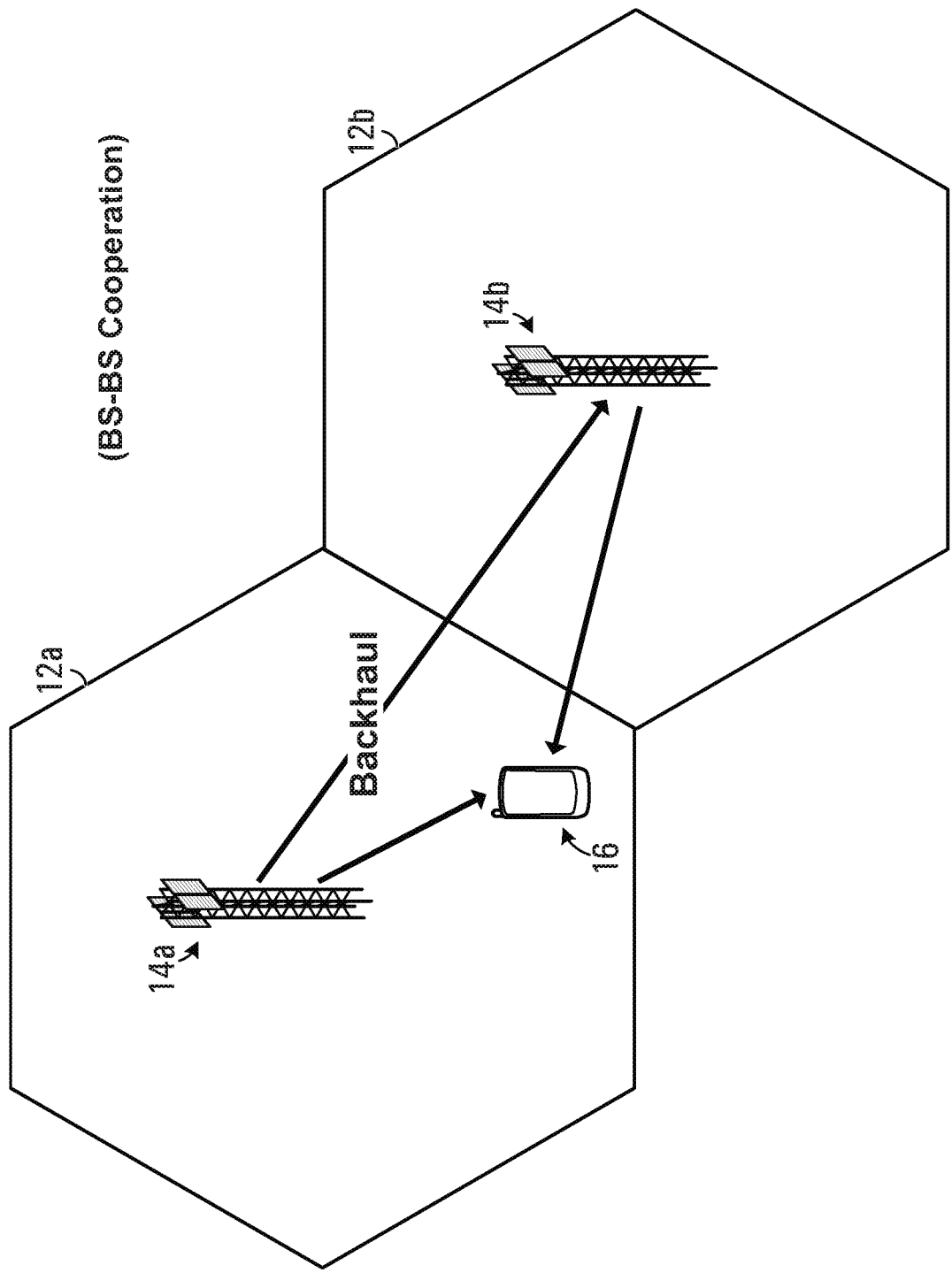

FIGS. 8A-8C depict three exemplary cooperation scenarios. Specifically, FIG. 8A depicts cooperation between base station 14 and relay 15 in serving mobile terminal 16 within a given cell 12. FIG. 8B depicts transmission by base station 14 to two relays 15, and cooperation between relays 15 to serve mobile terminal 16 in a given cell 12. FIG. 8C depicts cooperation between base station 14a in cell 12a and base station 14b in cell 12b to serve mobile terminal 16 situated in cell 12a. Hereinafter, the cooperating equipment may also be generally referred to as "cooperating sites".

As will be further detailed below, cooperating sites may cooperate in different ways. However, at minimum, cooperation may require that some information be shared between the cooperating sites (e.g. to coordinate transmission to a particular target mobile terminal 16). In this regard, the cooperating sites may be controlled by a base station controller (e.g. base station controller 10) which is in communication with the cooperating sites. Alternatively, cooperating sites may be interconnected via a network, e.g. backhaul network 11 or other network, such as the internet. Conveniently, in the techniques described below requiring coordination between cooperating sites, such coordination may take place via base station controller 10 and/or other network.

As previously discussed, a cellular network may include a plurality of base stations 14 and relays 15 serving a plurality of mobile terminals 16 in a plurality of cells. Thus, a given mobile terminal 16 may be within reception range of a number of base stations 14 and relays 15. Moreover, a given base station 14 or relay 15 may be within transmission/reception range of one or more other base station(s) 14 or relay(s) 15. Thus, it would be desirable if two or more base stations 14 and/or relays 15 (hereinafter also referred to as "transmitting sites") could cooperate in serving mobile terminals 16. As further detailed below, such cooperation may provide increased quality of service to mobile terminals 16. Accordingly, the present application discloses a number of schemes whereby base stations and relays may cooperate in serving one or more mobile terminals 16.

In overview, both closed loop cooperation and semi-closed loop cooperation schemes are disclosed in the present application. In the disclosed closed loop scheme, cooperating transmitters (e.g. a base station 14 or relay 15) may have knowledge of partial or full channel state information (CSI). Their target (e.g. mobile terminal 16) may constructively add the transmissions received from the various transmitting sites. In the disclosed semi-closed loop scheme, all or some of the cooperating sites may perform closed loop techniques within each site, however, the cooperation among transmitting sites may be open loop.

In a first exemplary embodiment of the present application, cooperating sites (e.g. base stations 14 and relays 15) may employ open loop cooperation in the form of time/frequency (tone) switching transmit diversity. As discussed previously, OFDM divides the transmission band into multiple carriers/bands each of which is referred to as a sub-carrier or sub-band. Different adjacent sub-carriers may be used by different sites (i.e., a given base station 14/relay 15 may be assigned a particular sub-carrier in which to transmit). Alternatively, all transmitting sites may transmit on the same sub-carrier(s); however, each cooperating site may transmit only in a portion of tones in the assigned sub-carrier(s). The specific tones assigned to the different cooperating sites may be interlaced in the time and/or frequency domain. Antennas (i.e. transmitters) within each cooperating site may employ an open loop scheme (e.g. transmit diversity or spatial multiplexing). It may be appreciated that this exemplary embodiment may be combined with other transmit diversity cooperation schemes such as space-time-frequency transmit diversity (e.g. Alamouti code).

In a second exemplary embodiment of the present application, all cooperating sites may transmit the same signal to a target mobile device 16. One of the cooperating sites, typically the equipment such as a base station 14 serving the cell in which the target mobile device 16 is situated, may be identified as the serving site. Due to the differences in the paths between a given serving base station 14 and target mobile device 16, the cooperating sites may be required to carry out timing/distance adjustments. More specifically, and as further detailed below, the sites may cooperate using one or more of the following techniques: multi-site beamforming; multi-site closed loop precoding; and heterogeneous closed loop.

In order to carry out the multi-site beamforming technique, two or more sites (e.g. base station 14/relay 15) may transmit as an array. Each site may beam signals containing identical data. In FDD, the beam is formed using the intended mobile terminal's uplink Angle of Arrival (AoA). At the target mobile device 16, constructive superposition may be employed to combine the received signals. To this end, a superposition dedicated pilot signal may be employed for channel estimation. As may be appreciated, constructive superposition requires timing and distance adjustment between the cooperating sites as the signals from the different cooperating sites may arrive at the target mobile terminal 16 at different times due to differences in path characteristics (e.g. physical distances) to the target. Thus, the transmitted signals may be linearly phase shifted. To compensate, conveniently, the target mobile terminal 16 may consider one of the transmitting sites as a reference site, and report timing differences to the other transmitting sites. Each of the other transmitting sites may, in turn, adjust timing of its transmissions so that the signals arriving at the target mobile terminal 16 may be constructively combined. It has been observed that different signal frequencies may be phase shifted by different amounts. Thus, in order to detect such phase differences, orthogonal pilot signals may be employed. Upon detecting a phase difference(s), the target mobile terminal 16 may report the phase difference(s) to the corresponding transmitting sites, using known techniques. Based on this feedback, the transmitting sites may then perform appropriate phase correction using known phase correction techniques (e.g. codebook phase correction). Moreover, the transmitting sites may perform opportunistic phase correction for nomadic target mobile terminals 16 wherein the different transmitting sites apply random phase sequences. Based on CQI reports, the best phase combination may be evaluated and thereafter employed.

To carry out the multi-site closed loop precoding, different MIMO transmitting sites may form the same beams to the target mobile device 16 using precoders. When employing FDD, a target mobile terminal 16 may report/specify which precoder to use to the transmitting site(s), and may report different precoders to different transmitting sites. At a given site, a precoder set may be re-used. In this manner, a signal may be improved by phase correction according to one of the exemplary methods detailed above. Alternatively, the precoder may be selected taking into consideration all transmitting sites, thus obviating the need for further phase correction techniques. While timing and distance adjustments may still be required, the signals transmitted in this manner may be less susceptible to timing differences than when transmitted using the multi-site beamforming method previously detailed above. Notably, to carry out this technique, orthogonal common pilots may be required for precoder selection; orthogonal common pilots or superpositioned dedicated pilots may be required for demodulation.

For the heterogeneous multi-site closed loop/beamforming technique, array and MIMO sites may send the same data stream to the target mobile terminal 16. Precoder selection may be employed for the MIMO site(s). Timing and distance adjustments as well as phase correction (similar to the multi-site beamforming method detailed above) may be required between the sites. Conveniently, the MIMO site(s) may carry extra data streams to improve throughput of the system. A common pilot for FDD precoder selection may be employed in addition to a superposition dedicated pilot for demodulation.

As previously explained, timing/distance differences in signals transmitted from the various transmitting sites may result in linear phase shifts of the signals in the frequency domain. Thus, in order to achieve constructive interference of the arriving signals at the target mobile terminal 16, the transmitted signals may be corrected. Accordingly, in a third embodiment of the present application, target mobile terminal 16 may measure the timing mismatch of arriving signals using arrival time estimation or channel estimation techniques. One transmitting site may be considered the reference site and timing differences of the different arriving signals may be reported to the non-reference transmitting sites by target mobile terminal 16. Each transmitting site may then apply linear phase correction techniques in the frequency domain to correct for the detected timing differences. Specifically, only those tones assigned to the intended target mobile terminal 16 may be linear phase adjusted, the transmitter (e.g. base station 14) may be also transmitting to other mobile terminals. Therefore, a phase correction of all signals transmitted by that transmitter may result in a degradation of the signals intended for the other mobile terminals. Also, notably, phase is adjusted in the frequency domain as opposed to the in the time domain because adjustment in the time domain may result in timing mismatch to mobile terminals that the transmitting site is serving, other than target mobile terminal 16.

As discussed above, phase correction may be achieved by a number of different techniques, including, in particular, codebook-based phase correction. In a fourth exemplary embodiment of the present application, variations on codebook-based phase correction may be employed to achieve cooperation between cooperating sites. Generally, the specific technique may vary by the number of cooperating sites, as follows.

For two cooperating transmitting sites, a two transmitter constant amplitude codebook may be employed. The non-serving transmitting site may be used as the phase reference. A fixed precoder may be assigned to the non-serving transmitting site. The target mobile terminal 16 may report a preferred precoder to the serving transmitting site for phase correction. In this technique, only phase correction feedback need be provided to the serving transmitting site.

Cooperation between greater than two transmitting sites (i.e., M>2 where M is the number of transmitting sites) may be achieved also by employing a two transmitter constant amplitude codebook. Specifically, the non-serving transmitting site may be used as the phase reference and a fixed precoder may be pre-assigned to the non-serving site. M−1 precoders may be reported to the serving transmitting site and all other non-serving transmitting sites for phase correction. Alternatively, cooperation between M>2 sites may be achieved by using a M-transmitter constant amplitude codebook. Specifically, the non-serving transmitting site may be used as the phase reference and pre-assigned a fixed precoder. One precoder may be reported to the serving transmitting site and all other non-serving transmitting sites for phase correction.

An example of codebook-based phase correction for a two transmitter LTE codebook for two transmitting site cooperation is as follows. Each of the two sites may have an antenna array or MIMO antennas. The precoder set may be $\{[1,1]^T, [1, j]^T, [1,-1]^T, [1, -j]^T\}$ where the first transformation in the set represents a 0° phase shift, the second represents a 90° phase shift, the third represents a 180° phase shift and the last represents a 270° phase shift. The serving transmitting site may be assigned to port 2 and the helping transmitting site to port 1. The best precoder that aligns the phases of the two sites (i.e. maximizes the received power of the signals) may be determined. This determined precoder may then be reported to the serving transmitting site. However, there may be no need to report the precoder to the helping site (because the helping site is transmitting on port 1, and the first element of the precoding matrices is always a "1"). As may be appreciated, codebook-based techniques may restrict phase shifting to certain pre-defined amounts therefore, it may be expected that system performance may be improved with a bigger codebook that provides the ability to phase shift by a greater number of pre-defined amounts.

A further example of codebook-based phase correction, in which the serving site is represented by the subscript "2", and the other cooperating site by subscript "1", to send a one-layer data X, is as follows.

$$Y=[H_1P_1H_2P_2]P_{pc}X+n=H_{eq}P_{pc}X+n;$$

Where $P_1$=argmax, $P \in Q_M \|H_1P\|$;
$P_2$=argmax, $P \in Q_M \|H_2P\|$;
$P_{pc}$=argmax, $P \in Q_M \|H_{eq}P\|$; and where
$H_1$ and $H_2$ are the channel matrices from the cooperation sites;
M is the number of transmit antennas;
n is noise;
$Q_M$ is the set of possible precoders;
$P_1$ and $P_2$ are the corresponding precoders; and
$P_{pc}$ is the phase correction precoder from the set of two transmitter precoders.

In the above example, joint selection of $P_1$, $P_2$ and $P_{pc}$ may improve performance of a closed-loop system. However, a potential drawback of this technique is higher codebook search complexity since there are three codebooks (i.e. it may be more complex to determine the optimum combination of the three codebooks). Moreover, for multi-layer data transmission, one phase correction precoder per layer may be reported by the mobile to the base station.

In some scenarios, in order to limit feedback overhead and precoder set size, virtual antenna precoders may be applied. Notably, a multiple antenna array may be formed between antennas at transmitting sites (e.g. base stations 14/relays 15) that are situated sufficiently close together to be able to exchange information required to form a multiple-antenna transmitter. Accordingly, in an exemplary fifth embodiment of the present application, cooperation between two sites each with four transmit antennas to transmit one data stream to a target mobile terminal 16 may be achieved with the following three exemplary techniques. Each technique involves a pre-coding matrix index (PMI) report. In the first exemplary technique, PMI1 is sent to transmitting site 1 and PMI2 is sent to site 2 wherein both PMI1 and PMI2 are from a four-transmitter codebook. Phase correction may be required. In the second exemplary technique, one PMI is reported to both transmitting sites from an eight-transmitter codebook. Transmitting site 1 may use the upper half of the precoder and transmitting site 2 may use the lower half. The third technique uses a virtual antenna. Each transmitting site is treated as the equivalent of a two-antenna transmitter, and one PMI is sent to both antennas. The virtual antenna precoder may be derived using AoA. It has been observed that the second example has the highest gain and the third example has lower overhead. It may be noted that the second example requires a larger codebook and that example one requires three PMI feedbacks (i.e. one for each site in additional to the cooperation codebook).

In each of the above exemplary embodiments, closed-loop and semi-closed loop schemes may be employed. It may be appreciated that each has advantages and disadvantages. Specifically, some advantages of semi-closed loop schemes include easy implementation in that a single site feedback signaly may be reused; there may be no need for fine timing adjustments; there may be no need for beam phase correction; cooperation between MIMO and array transmitting sites (i.e. heterogeneous cooperation) may be facilitated. Moreover, semi-closed loop schemes may be more robust against channel aging since channel coefficients from the same site age in the same way especially at LoS (line of sight) conditions and/or array sites. Semi-closed loop schemes may also be more robust against carrier frequency synchronization errors. Benefits of closed-loop schemes involve better performance by exchanging channel state information (CSI) between transmitting sites.

More specifically, the following semi-closed loop (CL) schemes may be employed in conjunction with the above-described exemplary embodiments In a first exemplary semi CL scheme, multi-site CL transmit diversity may be employed wherein different MIMO sites transmit the same CL stream(s) to a target mobile terminal 16 using a transmit diversity scheme such as Alamouti. Alternatively, multi-site beamforming (BF) transmit diversity may be employed wherein different array sites transmit the same BF stream(s) to the user using a transmit diversity scheme such as Alamouti. In a further alternative, multi-site CL spatial multiplexing (SM) may be employed wherein different MIMO sites transmit independent CL streams to the target mobile terminal 16. In this alternative, precoder selection may minimize inter-layer interference, and the same precoder set may be reused. In yet a further alternative, multi-site BF spatial multiplexing may be employed wherein different array sites may transmit independent beams to the target mobile terminal 16.

The following multi-site closed loop transmit diversity scheme may be employed in conjunction with the above-described exemplary embodiments. Different transmitting MIMO sites may each send a CL stream to the target mobile terminal 16. Moreover, the different transmitting sites may form a transmit diversity scheme between them. This scheme may require orthogonal common pilots for precoder selection, as well as orthogonal common pilots or orthogonal dedicated pilots for demodulation. The transmit diversity scheme may include band switching, tone switching and space-tone coding. For example, cooperation between two four-transmitter FDD sites may be carried out as follows. The target mobile terminal 16 may report two independent precoders to the transmitting sites and the two sites may send two streams of Alamouti (SFBC or STBC) to the target mobile terminal 16. The same approach may be followed for transmit diversity schemes of rate greater than one.

The following multi-site beamforming (BF) transmit diversity scheme may be employed in conjunction with the above-described exemplary embodiments. Different array sites may each send a beam to the target mobile terminal 16, and the different beams may form a transmit diversity scheme (e.g. band switching, tone switching and space-tone coding) between them. In this scheme, orthogonal dedicated pilots for demodulation may be used.

The following multi-site closed-loop SM scheme may be employed in conjunction with the above-described exemplary embodiments. Different MIMO sites may transmit independent CL streams to the target mobile terminal 16. Different precoders may be selected for different sites. A single-site precoder codebook may be reused. Furthermore, the precoder may be selected to minimize inter-layer interference. This may increase spectral efficiency for high geometry users. Orthogonal common pilots for FDD precoder selection, and orthogonal common pilots or orthogonal dedicated pilots for demodulation may be used. In a related alternative, multi-site beamforming SM may be employed wherein different array sites may transmit independent beams to the target mobile terminal 16. AoA may be used for beamforming. Likewise, orthogonal dedicated pilots may be used for demodulation.

The following heterogeneous multi-site SM/transmit diversity schemes may be employed in conjunction with the above-described exemplary embodiments, in particular, for heterogeneous multi-site SM, array and MIMO sites may transmit independent data streams to the target mobile terminal 16. Precoder selection may minimize the interlayer interference between the two sites. A common pilot for FDD precoder selection may be employed and orthogonal pilots between the transmitting site may be used for demodulation. To achieve heterogeneous multi-site transmit diversity, array and MIMO sites may transmit data streams of a transmit diversity scheme to the target mobile terminal 16. A common pilot for FDD precoder selection may be used. Likewise, orthogonal pilots between the sites for demodulation may be used.

In summary, notable aspects of the above-described embodiments include cooperation between two or more transmitting sites (e.g. base station 14/relay 15) to serve one or more target mobile terminals. To this end, the transmitting sites may employ open loop cooperation with tones from the different transmitting sites interlaced (i.e. tone switching transmit diversity). In addition, the transmitting sites may also cooperate in a closed-loop manner to send data to a target mobile terminal. Constructive superposition of the different received signals may occur at the target mobile terminal. Closed-loop operation may also be based on MIMO channel coefficients, MIMO precoders or beamforming.

As detailed above, signals may be linearly phase shifted in the frequency domain during transmission from the transmitting site(s) to the target mobile terminal. Consequently, some of the above-described embodiments include linear phase correction techniques in the frequency domain to cancel the effect of timing mismatches in the arriving signals at the target mobile terminal. Moreover, as described, phase correction may also be achieved using codebook phase correction. In particular, a two-transmitter codebook may be employed for cooperation between two transmitting sites, whereas a two-transmitter or M-transmitter (where M>1) codebook may be used for cooperation between M sites.

Also as detailed above, virtual antenna closed-loop precoding may be employed to limit feedback overhead for aggregate precoding matrix reporting. Conveniently, the number of antenna ports may be reduced at each transmitting site by using virtual antenna techniques.

Lastly, also as detailed above, semi-closed loop cooperation between the sites may be employed. Specifically, within each site closed-loop techniques may be employed, whereas open loop (OL) cooperation may occur between sites. Even more specifically, OL cooperation techniques may be employed in sending the same data from different transmitting sites using a transmit diversity scheme, for example, frequency shifting or Alamouti (semi-CL transmit diversity). Moreover, OL techniques may be employed in sending different data streams from different sites (semi-CL SM). CL operation within each site may be based on MIMO channel coefficients, MIMO precoders or beamforming. In this manner, cooperation between heterogeneous sites may be facilitated.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. In a cellular communications network comprising a plurality of transmitting sites that include a first transmitting site and a second transmitting site, a method of transmitting data to a target mobile terminal, comprising:
   receiving, at the first transmitting site from the target mobile terminal, a first precoder, the first transmitting site comprising a first antenna array;
   receiving, at the second transmitting site from the target mobile terminal, a second precoder and phase correction feedback based on one or more phase differences of signal frequencies detected by the target mobile terminal, the second transmitting site comprising a second antenna array;
   transmitting, from the first transmitting site, a first data stream to the target mobile terminal using a first beam formed by the first antenna array; and
   transmitting, from the second transmitting site, a second data stream to the target mobile terminal using a second beam formed by the second antenna array, wherein the second transmitting site performs a phase correction based on the phase correction feedback to result in constructive addition of the first and second beams upon arriving at the target mobile terminal, the phase correction being performed by applying random phase sequences to determine a best phase combination.

2. The method of claim 1, wherein the first data stream is the same as the second data stream.

3. The method of claim 1, wherein a frequency selective phase of the second stream is adjusted by the second transmitting site.

4. The method of claim 1, wherein the first data stream and the second data stream utilize different radio resources.

5. The method of claim 1, wherein the first precoder is independent of the second precoder.

6. The method of claim 1, wherein the first precoder and the second precoder are selected from a precoder set, and a same precoder set is used for the first and second transmitting sites.

7. The method of claim 1, further comprising:
   transmitting a common pilot signal to the target mobile terminal from the first transmitting site and the second transmitting site, wherein the common pilot signal from the first transmitting site is orthogonal to the common pilot signal from the second transmitting site.

8. The method of claim 7, wherein the common pilot signal is used by the target mobile terminal for selecting a precoder for each of the first and second transmitting site.

9. The method of claim 1, wherein the first data stream and the second data stream are received at the target mobile terminal, concurrently, as a superimposed signal.

10. The method of claim 1, wherein the one or more phase differences are detected by employing orthogonal pilot signals.

11. A cellular communications system comprising:
   a first receiver located at a first transmitting site, wherein the first receiver is configured to receive from a target mobile terminal, a first precoder, the first transmitting site comprising a first antenna array;
   a second receiver located at a second transmitting site, wherein the second receiver is configured to receive from the target mobile terminal a second precoder and phase correction feedback based on one or more phase differences of signal frequencies detected by the target mobile terminal, the second transmitting site comprising a second antenna array;

a first transmitter located at the first transmitting site, wherein the first transmitter is configured to transmit a first data stream to the target mobile terminal using a first beam formed by the first antenna array; and a second transmitter located at the second transmitting site, wherein the second transmitter is configured to:

transmit a second data stream to the target mobile terminal using a second beam formed by the second antenna array, and perform a phase correction based on the phase correction feedback to result in constructive addition of the first and second beams upon arriving at the target mobile terminal, wherein the phase correction is performed by applying random phase sequences to determine a best phase combination.

12. The cellular communications system of claim 11, wherein the first data stream is the same as the second data stream.

13. The cellular communications system of claim 11, wherein a frequency selective phase of the second data stream is adjusted by the second transmitter.

14. The cellular communications system of claim 11, wherein the first data stream and the second data stream utilize different radio resources.

15. The cellular communications system of claim 11, wherein the first precoder is independent of the second precoder.

16. The cellular communications system of claim 11, wherein the first precoder and the second precoder are selected from a precoder set, and a same precoder set is used for the first and second transmitters.

17. The cellular communications system of claim 11, wherein each of the first and second transmitters is configured to transmit a common pilot signal to the target mobile terminal, and the common pilot signal from the first transmitter is orthogonal to the common pilot signal from the second transmitter.

18. The cellular communications system of claim 17, wherein the common pilot signal is used by the target mobile terminal for selecting a precoder for each of the first and second transmitters.

19. The cellular communications system of claim 11, wherein the first data stream and the second data stream are received at the target mobile terminal, concurrently, as a superimposed signal.

* * * * *